(12) United States Patent
Vlad Cluve

(10) Patent No.: US 12,159,555 B2
(45) Date of Patent: Dec. 3, 2024

(54) SMART DEVICE FOR PROMOTING PRODUCTS ON A SHELF

(71) Applicant: Tokinomo Marketing SA, Bucharest (RO)

(72) Inventor: Mircea Ioan Vlad Cluve, Bucharest (RO)

(73) Assignee: Tokinomo Marketing SA, Bucharest (RO)

( * ) Notice: Subject to any disclaimer, the term of this patent is extended or adjusted under 35 U.S.C. 154(b) by 509 days.

(21) Appl. No.: 17/427,066

(22) PCT Filed: Jan. 31, 2020

(86) PCT No.: PCT/RO2020/000003
§ 371 (c)(1),
(2) Date: Jul. 29, 2021

(87) PCT Pub. No.: WO2020/159393
PCT Pub. Date: Aug. 6, 2020

(65) Prior Publication Data
US 2022/0122496 A1    Apr. 21, 2022

(30) Foreign Application Priority Data
Feb. 1, 2019 (RO) ............................ a 2019 00056

(51) Int. Cl.
*G09F 19/10* (2006.01)
*G09F 23/06* (2006.01)
(Continued)

(52) U.S. Cl.
CPC .............. *G09F 19/10* (2013.01); *G09F 23/06* (2013.01); *G09F 25/00* (2013.01); *G09F 27/00* (2013.01); *G09F 2027/001* (2013.01)

(58) Field of Classification Search
CPC .......... G09F 19/10; G09F 23/06; G09F 25/00; G09F 27/00; G09F 2027/001
See application file for complete search history.

(56) References Cited

U.S. PATENT DOCUMENTS

2009/0236420 A1    9/2009  Londo
2010/0006462 A1*   1/2010  McGuire ................. G09F 27/00
                                                    206/457

(Continued)

FOREIGN PATENT DOCUMENTS

CN      104679605 A     6/2015
JP      2018045106 A    3/2018
(Continued)

*Primary Examiner* — Gary C Hoge
(74) *Attorney, Agent, or Firm* — Ratza & Ratza (DP)

(57) ABSTRACT

A smart device for the promotion of shelf products exhibited in consumer commercial settings may utilize sound, motion, light, and smell when a consumer is proximate a shelf. The smart may consist of a motion transmission system (T) installed in a box (1), a modular universal gripping system (32), an integrated electronic circuit board (35) on which control and command components are installed; an electronically controlled magnet lamp (24), a smell dispenser (28), an audio system (A) consisting of a loudspeaker (34) and an audio amplifier (37), a motion sensor (29), and communication means (C) for bidirectional transmission/reception of the commands for operation parameters. Operation parameters may be keyed to a consumer's characteristics, reports on the traffic in front of the shelf where the device is installed, and the number of interactions with the consumer. This information may be uploaded on the web platform and provided as a report.

3 Claims, 7 Drawing Sheets

(51) Int. Cl.
    *G09F 25/00*    (2006.01)
    *G09F 27/00*    (2006.01)

(56) References Cited

U.S. PATENT DOCUMENTS

| | | | |
|---|---|---|---|
| 2010/0181389 A1* | 7/2010 | Chen | G09F 27/00 239/289 |
| 2013/0056555 A1 | 3/2013 | Yuhki et al. | |
| 2016/0349543 A1* | 12/2016 | Rogers | H05B 47/115 |
| 2017/0234746 A1 | 8/2017 | Cohen et al. | |
| 2019/0188782 A1* | 6/2019 | Howard | G06Q 30/0639 |
| 2019/0197925 A1* | 6/2019 | Tewksbury | A47F 11/10 |

FOREIGN PATENT DOCUMENTS

| | | |
|---|---|---|
| KR | 20140126845 A | 11/2014 |
| KR | 20160072436 A | 6/2016 |
| RO | 201500317 A | 12/2015 |
| WO | 2008020132 A2 | 2/2008 |

\* cited by examiner

Simplified logic scheme

SMART DEVICE FOR PROMOTING PRODUCTS ON A SHELF

FIELD OF THE INVENTION

The invention refers to a smart device for promoting products on a shelf which are exhibited in supermarkets, pharmacies, gas stations, DIY stores, etc. through sound, motion, light and smell when a consumer passes next to the shelf, used in advertising, marketing.

BACKGROUND OF THE INVENTION

Currently, the device for promoting products on a shelf is known only through sound and motion (patent application no. RO130106A0, authors MIRCEA-IOAN VLAD-CLUVE and RADU BOGDAN). The device according to RO130106A0 consists of a box having in the inside a step by step motor coupled to a drive wheel which engages the inner end of a movable shaft supported at the opposite end by some bearings and provided with a clamping system of the product, an audio speaker, a microprocessor, an MP3 player, a motor driver, a voltage regulator. On the outside of the box, in the proximity of the product, a remote sensor is provided which automatically controls the microprocessor when the consumer passes next to the product, the wheel motion being controlled by a position sensor that detects where the wheel is located and orders the motor to change the direction of movement forward and backward.

The disadvantages of this device are:
the product must be monitored daily by people physically present in stores, not provided with means of communication for transmitting information about consumers interested in products;
settings difficult to change, each device must be set individually after a laborious process;
it does not have a universal product grip, which means that for each product a special piece has to be made, thus increasing the time and cost of preparing the campaigns;
it has been found, following device operation, that the transmission mechanism is not reliable enough, it is failing relatively frequently;
it does not have the ability to illuminate the product, or to spread odors, which limits the potential impact on the consumer;
is noisy because of the motor and transmission system, which disturbs consumers in stores;
does not have a clearly established shelf fastening system, which raises stability issues and increases the risk of damage;
it does not have a protection system when the consumer pulls the product so that the mechanism cannot be jammed;
it is impossible to differentiate between consumer detection and a physical object placed in front of the shelf (such as a shopping trolley or a cargo pallet);
cannot be turned off when the store is closed which leads to unnecessary energy consumption;

The technical problem solved by the invention lies in the realization of a remote controlled automated device for promoting products displayed on a shelf.

According to the invention, the shelf-promotion device, according to the invention, consists of:
the motion transmission system, to move the product, installed in the box, containing an electric motor with a vibration dampener;
the modular universal product gripping system made of metal or plastic,
the integrated electronic circuit board based on the microprocessor installed in the box on which control and command components are installed,
the product lighting system comprising the electronically controlled magnet lamp,
and the smell dispenser system electronically controlled, installed outside the box;
the audio system, comprising the loudspeaker and the audio amplifier installed inside the box;
the motion sensor or the video camera detecting the consumer, and
communication means installed on the electronic board for bidirectional transmission/reception of the motion type commands, the type and frequency of illumination, the frequency of the odor triggering, the operating life of the device, the personalized transmission of the audio/light message according to consumer characteristics, reports on the traffic in front of the shelf where the device is installed, and the number of interactions with the consumer, this information being uploaded to a web/cloud software application and sent as a report to the customers, and is characterized by that the integrated circuit board consists of:
a voltage regulator which lowers the voltage from 12V to 5V to power the components operating at 5V—microprocessor, microcontroller, fan;
a microprocessor, which receives the signal from a motion sensor/camera installed outside the box, and decides to start an activation by commanding the led lamp, the motor, runs the audio file, and ac the smell dispenser, and connects to the web server using a dedicated software;
a microcontroller receiving the command from the microprocessor and controlling in turn the motor, the led lamp, a RGB control light indicator, a fan and voltage sensor, and receives signal from the motion sensor/video camera, which it sends further to the microprocessor;
a battery operated clock module which allows the tracking of time when the device is turned off;
a motor driver which receives the command from the microcontroller and in turn controls the motor movement,
an audio amplifier which increases the power of the signal received from the microprocessor;
the voltage sensor (not shown) designed to determine if the device is connected to an external battery, the charging level of the battery and to warn the web platform when it should be recharged,
an infrared position sensor (not shown) which is intended to detect the position of the mechanism and to transmit this information to the microprocessor via the microcontroller; and
Integrated WiFi/Bluetooth modules designed to transmit and receive radio signals over WiFi to communicate over the Internet through the dedicated software application or connect the device via Bluetooth to the mobile phone through the dedicated software application,
a cellular transmission module, used if a WiFi network is not available, allowing it to connect to the Internet and transmit/receive data, the integrated WiFi/Bluetooth modules, and the cellular transmission module constituting means of communication.

According to another aspect of the invention, the smart device has a motion transmission system comprising a chassis which is coupled to an electric motor with a vibration dampener coupled to a toothed pulley on which is installed a synchronous transmission belt which rotates an assembly comprising another toothed pulley having a 2/1 transmission ratio, a piston rod provided with radial ball bearings 9 on which a metal shaft is attached, which at the other end rests on a spherical ball bearing allowing movement on multiple axles, such ball bearing sitting in a housing, the piston rod being mechanically blocked by the top of the chassis so that, even if a consumer pulls the product, the mechanism cannot be jammed.

According to another aspect of the invention, the gripping system consists of:
- an "O" part which connects the universal grip to the shaft 10 of the device and can, by means of washers, correct when needed the angle of inclination of the grip so as to be parallel to the ground;
- a "Comb" part which has the function of a "spine" from which the other parts are gripped by the teeth provided for this purpose;
- a small sole for accommodating products of small thickness and supporting the weight of the product;
- a big sole for accommodating products of higher thicknesses and supporting the weight of the product;
- an "Extender" part that can be fastened to the "Comb" part by means of a "Connector" 19 if the product is tall and provided with teeth on both sides;
- an "S" part having 2 cavities, the first cavity being used to be connected to the "Comb" or "Extender" part by sliding through their teeth to the desired height, the second cavity being used to insert a hook-and-loop or double-sticking tape;
- an "E" part having 2 cavities, the first cavity being used to be connected to the "Comb" or the "Extender" part by sliding through their teeth to the desired height, the second cavity being used to insert a hook-and-loop or double-sticking tape;
- a "3-teeth" part with 4 cavities, the first 3 cavities used to be connected to the "Comb" or "Extender" part;
- the connector which is intended to connect the "Comb" part with the "Extender" part if the product is tall;
- a hook-and-loop or double-sticking tape that will be inserted into the special cavity provided in "S", "E" or "3 teeth" part, the product being attached to this tape.

The benefits of the new device are:
- due to its much smaller dimensions it occupies only one side of the shelf;
- allows automated alerts to be sent to the server when the device is not working properly, and at the same time allows remote set-up of all devices, thus significantly reducing costs and time;
- allows testing the device proper functioning at the time of installation;
- facilitates connection to a new WiFi network;
- sends the device location to the server and allows us to set an audio volume that matches the location where it is installed.
- does not use additional tools (screwdriver, key, etc.) for fastening, can accommodate a wide variety of products, leading to significant elimination of operating costs, while being much easier to use;
- can be assembled and manufactured quickly, thus reducing costs and allowing mass production.
- the noise produced by the mechanism is significantly reduced;
- the device can support weights up to 1500 grams, thus diversifying the range of products that can be promoted.
- allows automatic shutdown of the device when the store is closed and automatic start when the store opens again.

BRIEF DESCRIPTION OF THE DRAWINGS

An embodiment example of the invention will now be described with reference to FIGS. 1-6 which are.

DETAILED DESCRIPTION OF THE PREFERRED EMBODIMENT

Figure 1:
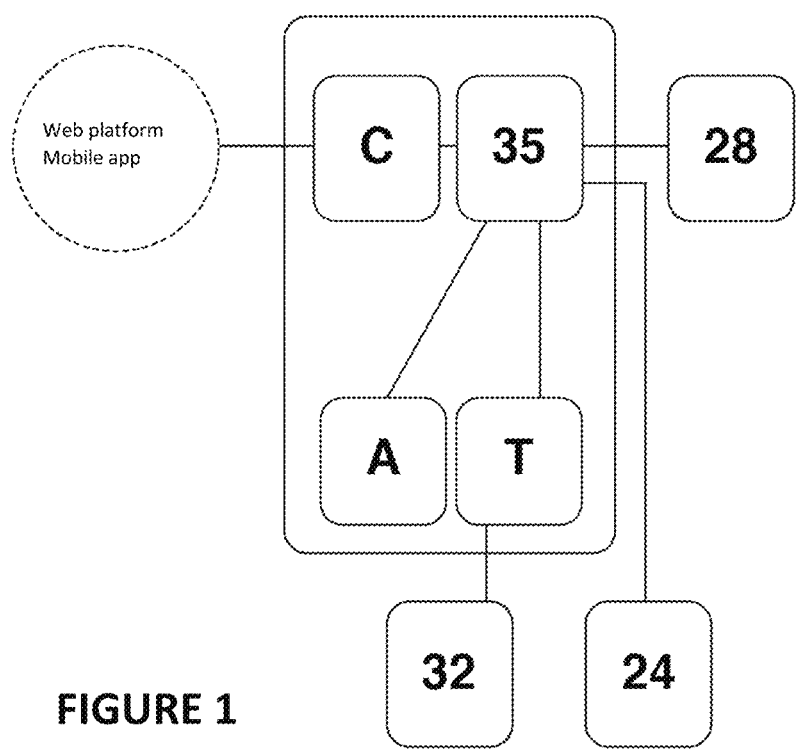
FIG. 1—Block diagram of the device according to the invention.

The device for promoting products on the shelf by sound, motion, light and odor, FIG. 1, consists of a motion transmission system T installed in a box 1, a modular universal gripping system 32 made of metal or plastic, a microprocessor-based electronic circuit board 35 installed in the box 1, an electronically controlled magnet lamp 24, an electronically controlled smell dispenser 28, the lamp 24 and the dispenser 28 being installed outside the box 1. The device is further provided with an audio system A comprising a loudspeaker 34 installed inside the box 1 and an audio amplifier 37 installed on the board 35, and the communication module C for transmitting remote commands relating to the type of motion, light intensity, odor type/intensity, device operating time, customized audio message transmission according to consumer characteristics, etc. to a web platform/mobile phone.

Figure 2:
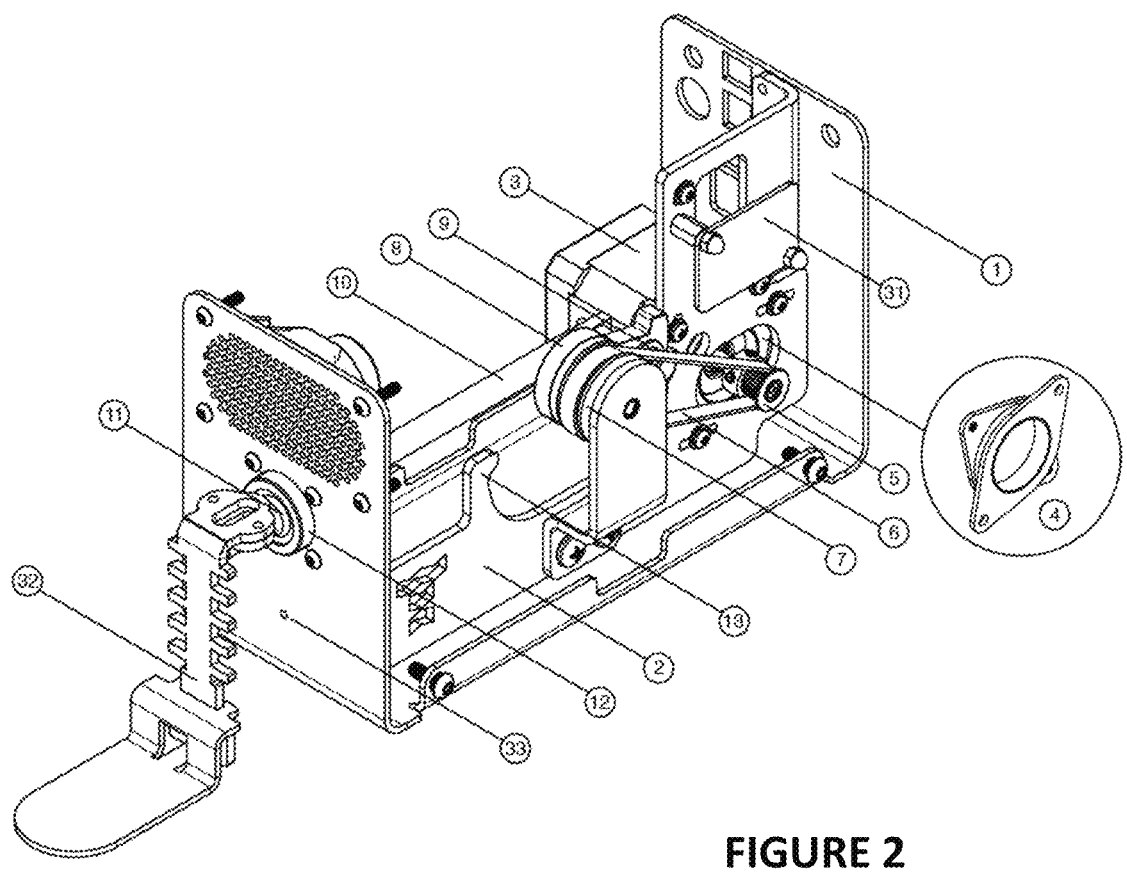
FIG. 2—Side schematic view of the motion transmission system of the device according to the invention.

According to FIG. 2, in the box 1 is installed the motion transmission system A comprising a chassis 2, to which is attached an electric motor 3 with a vibration dampener 4 coupled to a toothed pulley 5 on which is installed a synchronous transmission belt 6 which rotates an assembly composed of another toothed pulley 7 (having a transmission ratio of 2/1), a piston rod 8 provided with radial ball bearings 9, from which a metal shaft 10 is clamped, which at the other end rests on a ball bearing 11 that allows multiple axis movement, bearing ball sitting in a specially designed housing 12. The piston rod is mechanically blocked by the upper part 13 of the chassis 2 so that even if a consumer pulls the product, the mechanism cannot be jammed.

Figure 4:
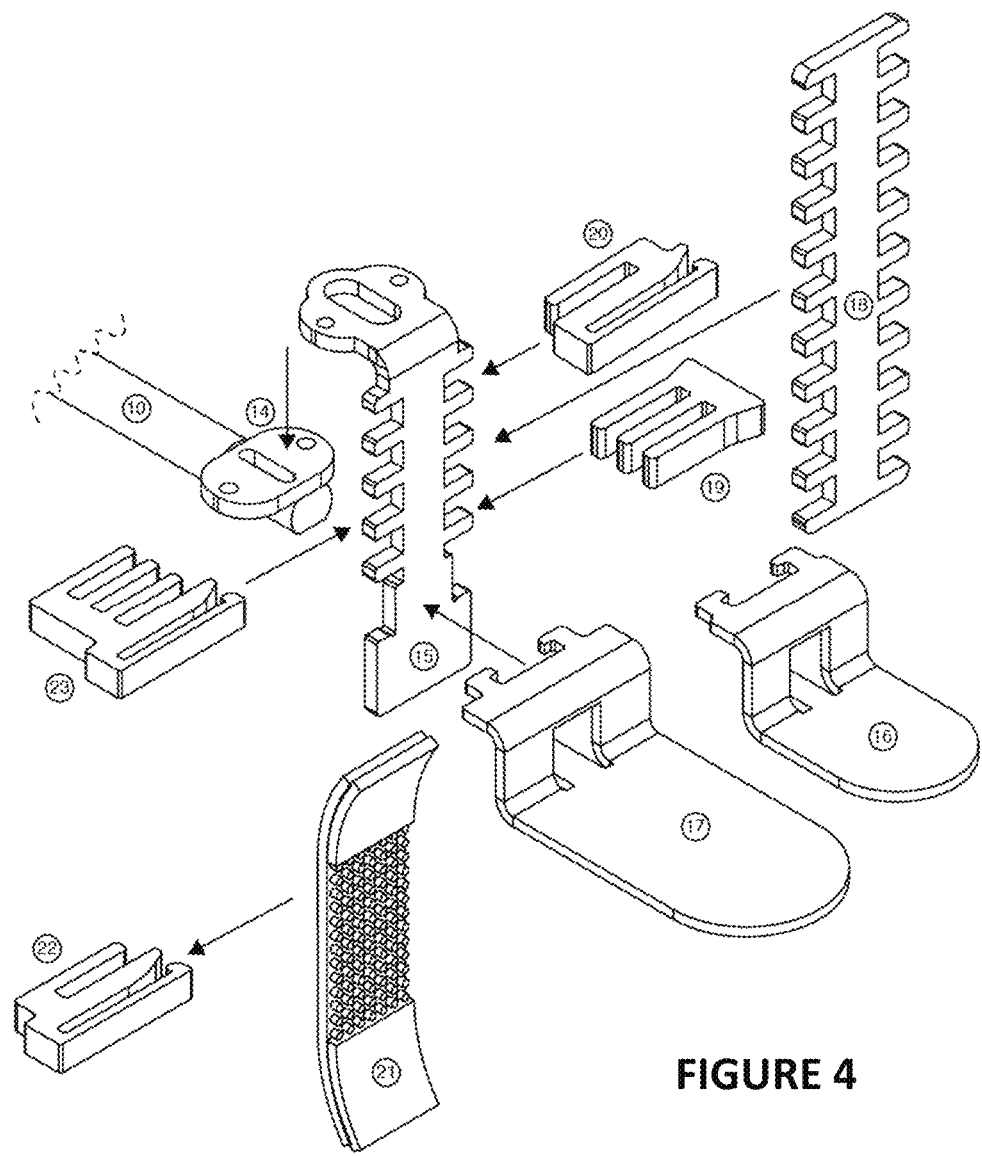
FIG. 4—View of the system for fastening/clamping the product according to the invention.

The device according to the invention, FIG. 4, is furthermore provided with a modular universal metal or plastic gripping system 32 comprising an assembly of parts easily to install/disassembly in order to accommodate any type of product.

These parts are:

"O" part 14 which connects the universal grip to the shaft 10 of the device and can, by means of washers, correct when needed the angle of inclination of the grip so as to be parallel to the ground.

"Comb" part 15 which has the function of a "spine" from which the other parts are gripped by the teeth provided for this purpose.

A small sole 16 accommodating products of small thickness. This part supports the weight of the product.

A big sole 17 accommodating products of higher thicknesses. This part supports the weight of the product.

"Extender" part 18 that can be fastened to the "Comb" part by means of a "Connector" 19 if the product is tall and provided with teeth on both sides.

"S" part 20 having 2 cavities. The first cavity is used to be connected to the "Comb" 15 or "Extender" 18 by sliding through their teeth to the desired height. The second cavity is used to insert a hook-and-loop stripe or double-stick tape 21.

"E" part 22 having 2 cavities. The first cavity is used to be connected to the "Comb" 15 or the "Extender" 18 by sliding through their teeth to the desired height. The second cavity is used to insert a hook-and-loop stripe or double-stick tape 21. Whereas parts "S" and "E" 20, 22 slide in opposite directions, they lock on each other so that the product does not accidentally come out during use.

"3-teeth" part 23 with 4 cavities. The first 3 cavities are used to be connected to the "Comb" or "Extender" part. This part is used as a spacer according to which one of the 3 cavities is used for connection. The shape of the product will dictate which of the 3 cavities will be connected to the "Comb" or "Extension" parts.

The connector 19 is intended to connect the "Comb" part with the "Extender" part if the product is tall.

A double lock stripe 21 or double-stick tape that will be inserted into the special cavity provided in "S", "E" or "3 teeth" parts. The product will be attached to this tape. Being flexible, this tape gently molds the shape of the product and keeps it attached to the device.

The shelf device is attached by rubber or plastic/silicone suction cups or by magnet or by double stick tape or by hook and loop stripe.

Box 1 is protected with a lid 27 that can be made of metal or plastic.

Figure 3:
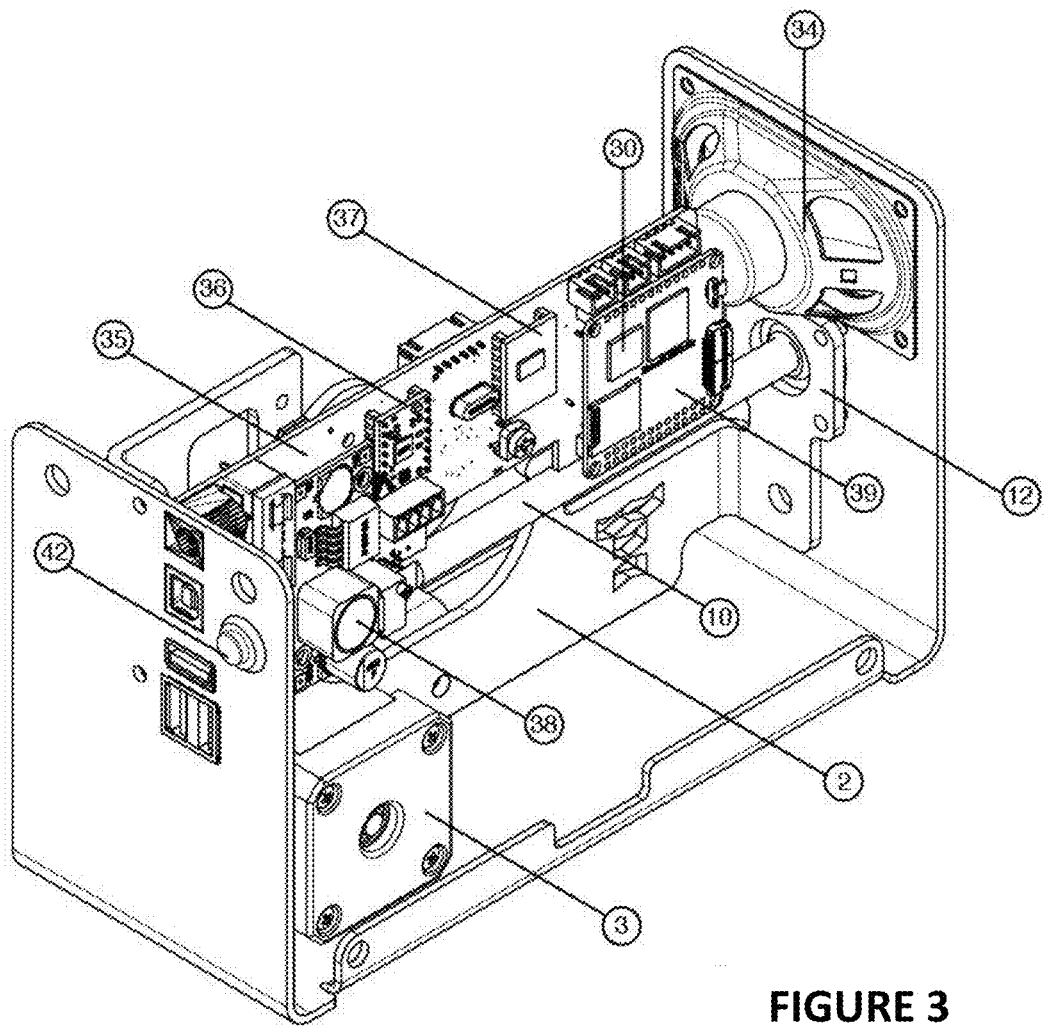
FIG. 3—Top schematic view of the integrated circuit board of the device according to the invention.

An integrated circuit board 35 incorporating a voltage regulator 38 that lowers the voltage from 12V to 5V is provided in box 1, FIG. 3, in order to power the components operating at 5V (microprocessor, microcontroller, fan) and a microprocessor 39. The microprocessor 39 is intended to be the brain of the device. It has installed an operating system on which a dedicated program is received which receives the signal from the motion sensor/video camera 29 and decides to start an activation by commanding the led lamp 24, the motor 3, it runs the audio file, or the odor sprayer 28, connects to the web platform or the mobile application. The electronic board 35 may further contain a microcontroller 40. The microcontroller 40 receives the command from the microprocessor and in turn controls the motor, the led lamp, the RGB control light indicator 33, the fan 38, the voltage sensor, and receives a signal from the motion sensor which it sends further to the microprocessor. On the electronic board there is also provided a battery clock module 41 which allows time to be counted when the device is turned off, a motor driver 36 which receives the command from the microcontroller 40 and in turn controls the motor motion 3, an audio amplifier 37 which increases the signal strength received from the microprocessor 39, a temperature sensor (not shown) that measures the temperature inside the box 1 and sends it to the microprocessor 39 which decides whether to turn on the fan 38—usually over 50° C., a voltage sensor (not shown) which is intended to determine, if the device is connected to an external battery, the charging level of the battery and to warn the web platform when it needs to be recharged, an infrared position sensor (not shown) which is intended to detect the position of the mechanism and transmit this information to the microprocessor 39 via microcontroller 40 and an audio loudspeaker 34 which plays the audio files sent by the microprocessor 39 through the audio amplifier and a fan 38 which starts when the temperature inside the device exceeds a certain value (50° C.). On the electronic board 35, there are also installed integrated WiFi/Bluetooth modules designed to transmit and receive radio signals over WiFi in order to communicate over the Internet via the dedicated application or to connect the device via Bluetooth to the mobile phone through the dedicated application. As a rule, the Bluetooth module is integrated with the WiFi one, but they are two different technologies that are used differently and can be installed separately. The communication means C further comprises a cellular transmission module 31, if a WiFi network is not available, allowing it to connect to the Internet and transmit/receive data. There is also a start/stop button 42 on the back of the box.

Figure 5:
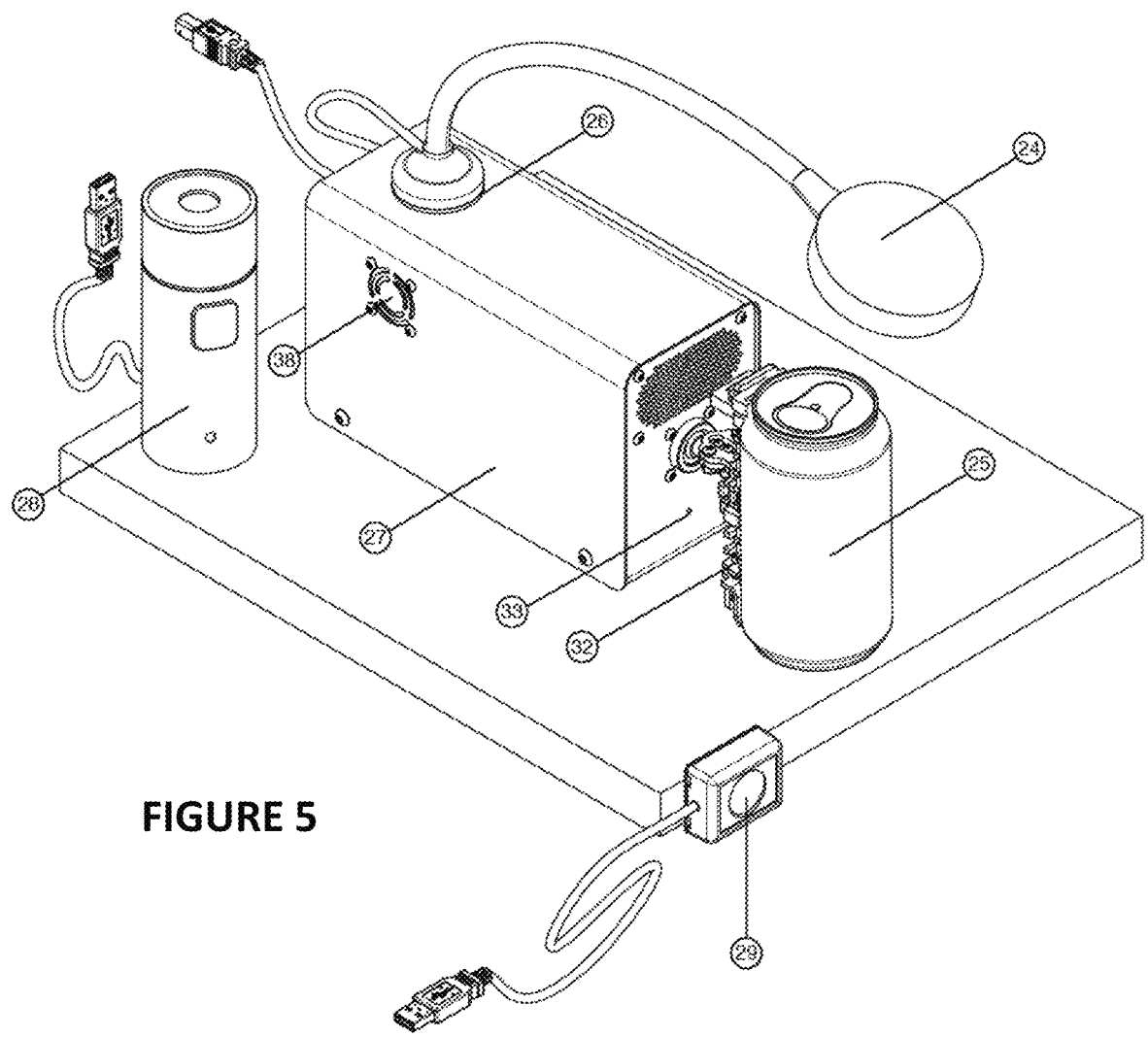
FIG. 5—Schematic view of the sound, motion, light and odor elements outside the box of the device according to the invention.

According to FIG. 5, box 1 is placed on the shelf behind the visible line of products.

Outside the box 1, a motion sensor 29, a led lamp 24 and an odor spray 28 are installed on the back of the box 1 via USB ports. The lamp has a magnet 26 which allows it to be attached to the metal housing 279 of the device or to the metal shelves. A RGB light indicator 33 is installed in front of the box 1 which indicates the operating state of the device by changing the color or frequency of the signal. At the external end of the shaft 10 is installed the universal grip system 32 to which the product 25 to be promoted is attached.

According to another embodiment, the motion sensor 29 is replaced by a video camera.

Figure 6:
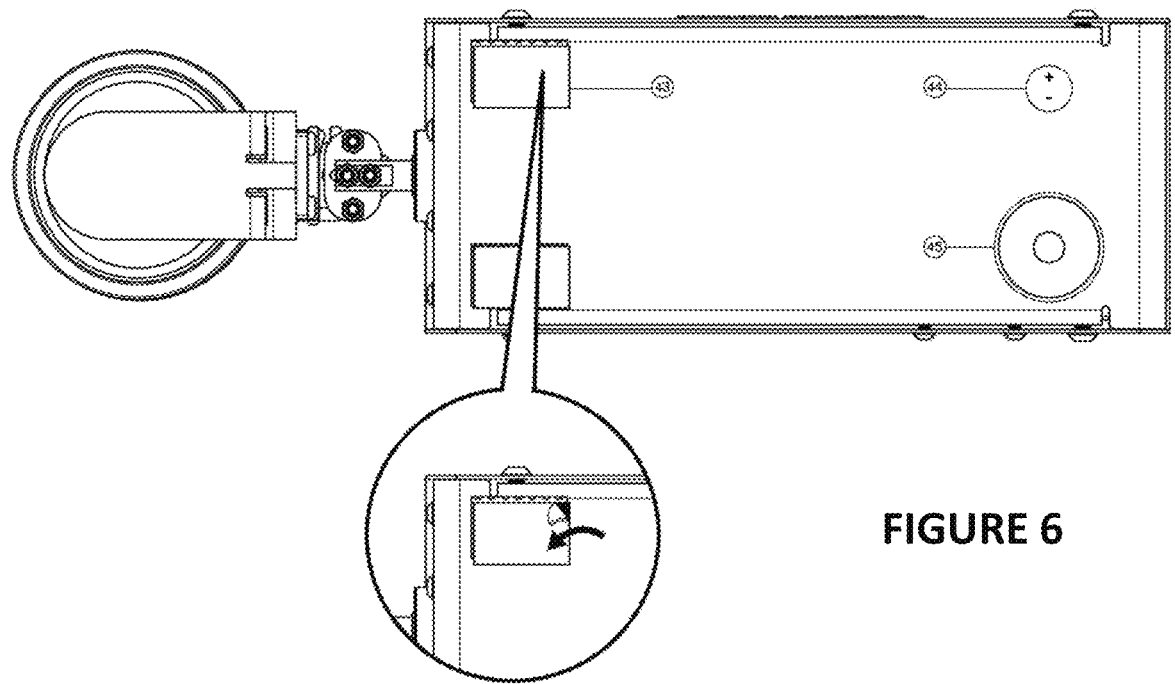
FIG. 6—Bottom view of the shelving system.

According to FIG. 6 the attachment of the shelf device can be made by rubber or plastic/silicone rubber suction cups 45 or by magnet 44 or by hook-and-loop stripe 43 or by double stick tape.

Figure 7:
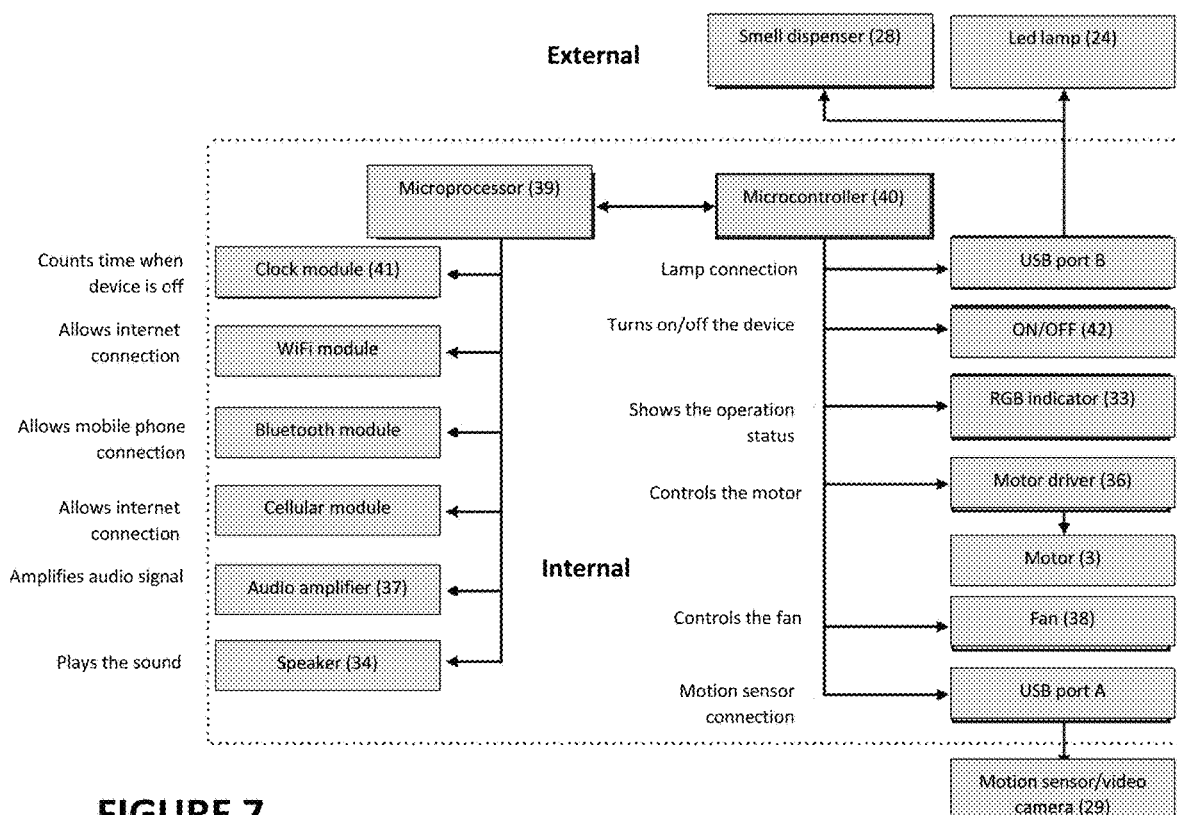
FIG. 7—Simplified logic scheme of operation of the device according to the invention.

The mode of operation is shown in FIG. 7. As soon as the motion sensor or video camera 29 detects the presence of the consumer in proximity, a signal is sent to the microprocessor 39. It triggers an activation comprising moving the product back and forth on the x-y axes in synchronous playback of the audio file (which may be a promotional message or a piece of music), turning on the led lamp 24 and/or the odor spraying by the odor sprayer 28.

Specifically, in order to move the product, the microprocessor 39 transmits a command to the microcontroller 40 which in turn gives a command to the motor driver 36 controlling the movement of the motor 3. The motor 3 moves the shaft via the transmission system T comprising the pulleys 5, 7, belt 6 and crank rod 8. With dedicated software, one can set more types of movement: slow or fast, random back and forth, constant back and forth, or if the audio file contains a song, a precise control of the movement in the rhythm of the music, so that the product seems to dance. Through the dedicated audio software one can also set the audio volume, as well as the flashing sequence of the led lamp 24 and the odor sprayer 28.

At the same time, by counting the number of activations and the number of motion sensor or video camera triggers 29, a report is generated that is forwarded to the dedicated server.

When the video camera is used for detection, the audio message can be customized according to the consumer profile (Example: The message for a young woman may differ from that for an elderly man).

The settings for each promotion campaign are made on the dedicated web platform and are sent to the device via the Internet.

To set up a new Internet connection, one can use the dedicated mobile application that connects to the device via Bluetooth. It may also be used to transmit the location in which the device is installed, to set the volume and to test the smooth operation of the motion, the led lamp 24, the motion sensor or the video camera 29, the fan 38 and the odor sprayer 28.

The use of a led lamp 24 to illuminate the product 25 can be synchronized with the movement of the product and the sound reproduction. This lamp can be illuminated for the entire duration of the activation, or it can be programmed to flash at preset intervals or to illuminate at the customer's request.

The smell dispenser 28 is connected via USB and sprays the aroma at preset intervals depending on the traffic in the store. Setting up this system will also be done through the dedicated web platform.

By using a motion sensor or a video camera 29 for detecting the consumers and triggering the activation of the device, depending on the type of detection used, it will be possible to extract traffic data from the respective shelf where the device is installed, as well as the number of interactions with the consumer. If a video camera is used, the audio message can be customized according to the consumer profile (Example: young or elder man, young or elder woman). This information will be uploaded to the web platform and will be sent as a report to the customer.

Information transmission is provided by the means of communication, namely the WiFi/Bluetooth module 30, the cellular transmission module 31, modules which allow, in conjunction with the web platform or the mobile phone application, to remotely transmit the motor operating parameters 3, the parameters of the led lamp 24, of the smell dispenser 28, to upload new audio files, to set the operating range of the device, to remotely monitor the operation of the device as well as in case of malfunctions, indications about the nature of the malfunction.

It will be understood that various details of the object described herein may be altered without going away from the scope. Furthermore, the foregoing description is merely intended to illustrate and not limit, so that the subject matter of the invention is defined by the claims set forth below.

The invention claimed is:

1. A smart device for the promotion of shelf products comprising:
    a motion transmission system (T), to move the product, installed in a box (1), containing an electric motor (3) with vibration dampener (4);
    a modular universal product gripping system (32) made of metal or plastic,
    an integrated electronic circuit board (35) based on a microprocessor (39) installed in the box (1) on which control and command components are installed,
    a product lighting system (24) comprising an electronically controlled magnet lamp,
    and an electronically controlled smell dispenser system (28), installed outside the box (1);
    an audio system, comprising a loudspeaker (34) and an audio amplifier (37) installed inside the box (1);
    at least one sensor selected from the set of sensors consisting of: a motion sensor and a video camera (29) detecting the consumer, and
    communication means (C) installed on the electronic circuit board (35) for bidirectional transmission/reception of information selected from the set of possible consisting of: motion type commands, type and frequency of illumination, frequency of the odor triggering, operating life of the device, personalized transmission of an audio/light message according to consumer characteristics, reports on traffic in front of the shelf where the device is installed, and a number of interactions with the consumer, this information being uploaded to a web platform and sent as a report to the customers, the communication means (C) being characterized by that the integrated circuit board (35) further consists of:
    a voltage regulator (38) which lowers the voltage from 12V to 5V to power the components operating at 5V—microprocessor, microcontroller, fan;
    a microprocessor (39), which receives the signal from a motion sensor/video camera (29) installed outside the box, and decides to start an activation by commanding the led lamp (24), the motor (3), runs the audio file, and the smell dispenser system (28), and connects to the web server using a dedicated software;
    a microcontroller (40) receiving the command from the microprocessor (39) and controlling in turn the motor (3), the led lamp (24), a RGB control light indicator (33), a fan (38) and voltage sensor, and receives signal from the motion sensor/video camera (29), which it sends further to the microprocessor (39);
    a battery operated clock module (41) which allows the tracking of time when the device is turned off;
    a motor driver (36) which receives the command from the microcontroller (40) and in turn controls motor movement (3),
    an audio amplifier (37) which increases the power of the signal received from the microprocessor (39);
    a voltage sensor designed to determine if the device is connected to an external battery, the charging level of the battery and to warn the web platform when it should be recharged,
    an infrared position sensor which is intended to detect a position of the mechanism and to transmit this information to the microprocessor (39) via the microcontroller (40); and
    at least one integrated WiFi/Bluetooth modules (30) designed to selectively communicate over the Internet through a dedicated software application and connect the device via Bluetooth to a mobile phone through the dedicated software application,
    a cellular transmission module (31), used if a WiFi network is not available, allowing it to connect to the Internet and transmit/receive data, the integrated WiFi/Bluetooth modules (30), and the cellular transmission module (31) constituting means of communication (C).

2. A smart device according to claim 1, the transmission system (T) further comprising: a chassis (2), to which the electric motor (3) with the vibration dampener (4) coupled to a toothed pulley (5) on which is installed a synchronous transmission belt (6) which rotates an assembly composed of another toothed pulley (7) having a transmission ratio of 2/1, a piston rod (8) provided with radial ball bearings (9) of which a metal shaft (10) is attached, which at the other end rests on a spherical bearing (11) allowing the movement on multiple axes, ball bearing sitting in a bearing (12), the piston rod (8) being mechanically blocked by the top (13) of the chassis (2) so that, even if a consumer pulls the product, the mechanism cannot be jammed.

3. A smart device according to claim 1, the product gripping system (32) comprising:
- an "O" part (14) which connects the universal grip to a shaft (10) of the device and can, by means of washers, correct when needed the angle of inclination of a grip so as to be parallel to the ground;
- a "Comb" part (15) which has the function of a "spine" from which the other parts are gripped by a plurality of teeth provided for this purpose;
- a small sole (16) for accommodating products of small thickness and supporting the weight of the product;
- a big sole (17) for accommodating products of higher thicknesses and supporting the weight of the product;
- an "Extender" part (18) that can be fastened to the "Comb" part by means of a "Connector" (19) if the product is tall and provided with teeth on both sides;
- an "S" part (20) having 2 cavities, the first cavity being used to be connected to the "Comb" (15) or "Extender" part (18) by sliding through their teeth to the desired height, the second cavity being used to insert a hook-and-loop or double-stick tape (21);
- an "E" part (22) having 2 cavities, the first cavity being used to be connected to the "Comb" (15) or the "Extender" part (18) by sliding through their teeth to the desired height, the second cavity being used to insert a hook-and-loop or double-sticking tape (21);
- a "3-teeth" part (23) with 4 cavities, the first 3 cavities used to be connected to the "Comb" or "Extender" part and the fourth cavity to insert a hook-and-loop stripe or double-sticking tape (21);
- the connector (19) which is intended to connect the "Comb" part with the "Extender" part if the product is tall;
- a double-stick tape (21) that will be inserted into the special cavity provided in "S", "E" or "3 teeth" part, the product being attached to this tape.

* * * * *